United States Patent
Cai et al.

(10) Patent No.: US 10,389,677 B2
(45) Date of Patent: Aug. 20, 2019

(54) ANALYZING MESSAGES IN SOCIAL NETWORKS

(71) Applicant: International Business Machines Corporation, Armonk, NY (US)

(72) Inventors: Ke Ke Cai, Beijing (CN); Hong Lei Guo, Beijing (CN); Jian Min Jiang, Beijing (CN); Zhong Su, Beijing (CN); Chang Hua Sun, Beijing (CN); Guo Yu Tang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 15/389,536

(22) Filed: Dec. 23, 2016

(65) Prior Publication Data
US 2018/0183747 A1    Jun. 28, 2018

(51) Int. Cl.
*H04L 12/58*    (2006.01)
*G06F 17/27*    (2006.01)
*G06Q 50/00*    (2012.01)

(52) U.S. Cl.
CPC .......... *H04L 51/32* (2013.01); *G06F 17/278* (2013.01); *G06Q 50/01* (2013.01); *G06F 17/2785* (2013.01)

(58) Field of Classification Search
CPC ..... H04L 51/32; G06F 17/18; G06F 2217/16; G06F 17/5009
See application file for complete search history.

(56) References Cited

U.S. PATENT DOCUMENTS

| | | |
|---|---|---|
| 9,122,989 B1 | 9/2015 | Morris et al. |
| 2011/0302103 A1 | 12/2011 | Carmel et al. |
| 2012/0296991 A1 | 11/2012 | Spivack et al. |
| 2013/0311408 A1 | 11/2013 | Bagga et al. |

(Continued)

FOREIGN PATENT DOCUMENTS

CN    104123377    10/2014

OTHER PUBLICATIONS

Agarwal, P., "Prediction of Trends in Online Social Network", M. Tech Thesis submitted in partial fulfillment of the requirements for the degree of Dual Degree in Computer Science and Engineering, Entry No. 2008CS50220, Department of Computer Science and Engineering, 2013, Indian Institute of Technology, New Delhi, pp. 1-30.

(Continued)

*Primary Examiner* — Kim T Nguyen
(74) *Attorney, Agent, or Firm* — Fleit Gibbons Gutman Bongini Bianco PL; Donna Flores (57) ABSTRACT

Embodiments of the invention provide a computer-implemented method, computing system and computer program product for analyzing a message in a social network. The method comprises identifying an entity from the message; detecting historical popularity of the entity in a social network; identifying a topic from the message; detecting historical popularity of the topic in the social network; and generating an entity-topic correlation factor for the entity and the topic based on the historical popularity of the entity and the historical popularity of the topic. Results obtained with embodiments of the invention may be provided to popularity prediction tools for improving popularity prediction of messages in social networks.

18 Claims, 4 Drawing Sheets

(56) References Cited

U.S. PATENT DOCUMENTS

2015/0066953 A1\* 3/2015 Krusell ............... G06Q 10/10
707/748

OTHER PUBLICATIONS

Yu, B., et al., "Toward Predicting Popularity of Social Marketing Messages", Proceedings of the 4th International Conference on Social Computing, Behavioral-Cultural Modeling, and Prediction, Mar. 29-31, 2011, pp. 1-8.
Ahmed, H., et al., "Prediction of Popular Tweets Using Similarity Learning", Proceedings of the 2013 IEEE 9th International Conference on Emerging Technologies, Dec. 9-10, 2013, pp. 1-6.
Crnovrsanin, T., et al., "Social Network Discovery Based on Sensitivity Analysis", Proceedings of the International Conference on Advances in Social Network Analysis and Mining, Jul. 20-22, 2009, pp. 1-6.

\* cited by examiner

ANALYZING MESSAGES IN SOCIAL NETWORKS

BACKGROUND

The present invention relates to popularity prediction of messages in social networks and, particularly, to analysis of social media messages for popularity prediction in social networks.

With the increased use of social media in social networks, prediction of popularity of social media messages has become an interesting task. Popularity detection is useful for risk alarming, online marketing (e.g., recommendation systems, media advertising, etc.) and real-world outcome prediction (e.g., economic trends).

There have been techniques to detect message popularity. Traditional features used in popularity detection tools are normally textual features, author features and sentimental features extracted from messages in social media. The traditional features are analyzed to predict popularity of the messages. There is a problem with using only the traditional features. If the textual feature, the author feature and the sentimental feature of one message are same as or similar to another, the popularity predicted for the one message might be similar to the other, but actually it is not the case. There may even be significant differences in their popularity.

SUMMARY

In view of the above, improved detection or prediction of popularity of messages in social networks, among other things, is desired. Specifically, the invention proposes a system and method for analyzing social media messages to detect their historical sensitivity which may be useful for allowing prediction tools to improve the detection of popularity of the messages.

According to one aspect of the present invention, there is provided a computer-implemented method for analyzing a message in social networks. The method comprises identifying an entity from the message. Historical popularity of the entity in social networks is detected. A topic is identified from the message and the historical popularity of the topic in social networks is detected. An entity-topic correlation factor (ETCF) for the entity and the topic is generated based on the historical popularity of the entity and the historical popularity of the topic.

According to another aspect of the present invention, a computing system is provided which comprises a computer processor coupled to a computer-readable memory unit. The memory unit comprises instructions that, when executed by the computer processor, implements a method for analyzing a message in social networks. The method implemented comprises identifying an entity from the message. Historical popularity of the entity in social networks is detected. A topic is identified from the message and the historical popularity of the topic in social networks is detected. An entity-topic correlation factor (ETCF) for the entity and the topic is generated based on the historical popularity of the entity and the historical popularity of the topic.

According to a further aspect of the present invention, there is provided a computer program product that is tangibly stored on a non-transient machine-readable medium and comprises machine-executable instructions for analyzing a message in social network. The instructions, when executed on an electronic device, cause the electronic device to identify an entity from the message, detect the historical popularity of the entity in social networks, identify a topic from the message, detect the historical popularity of the topic in social networks, and generate an entity-topic correlation factor (ETCF) for the entity and the topic based on the historical popularity of the entity and the historical popularity of the topic.

DETAILED DESCRIPTION

Some embodiments will be described in more detail with reference to the accompanying drawings, in which embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and for completely conveying the scope of the present disclosure to those skilled in the art.

Figure 1:
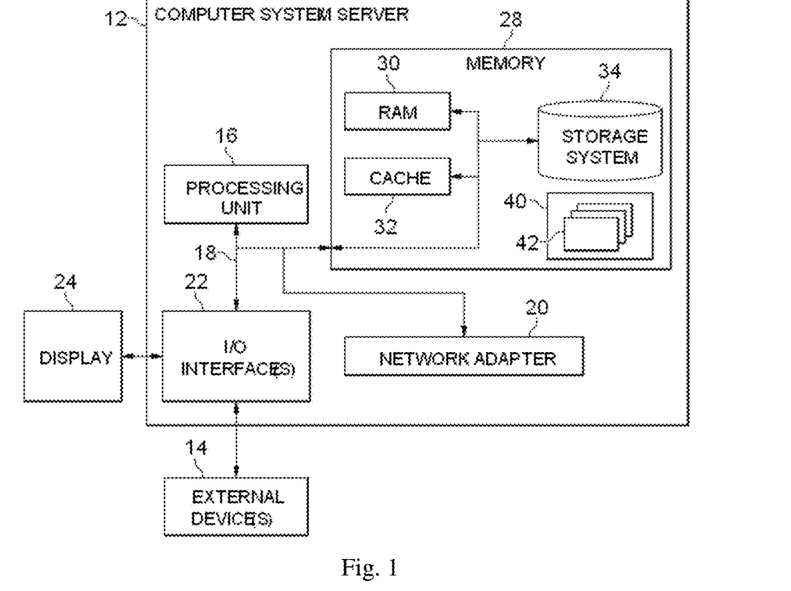
FIG. 1 shows an exemplary computer system which is applicable to implement embodiments of the present invention.

Referring now to FIG. 1, in which an exemplary computer system/server 12, which is applicable to implement the embodiments of the present invention, is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components, including system memory 28, to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

Computer system/server 12 typically includes a variety of computer system readable media. Such media may be any available media that is accessible by computer system/server 12, and includes both volatile and non-volatile media, removable and non-removable media.

System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, and data archival storage systems, etc.

The present invention may be implemented in the computer system/server 12. To better understand the invention, it would be advantageous to introduce some related knowledge helpful for understanding embodiments of the invention.

Inventors of the present invention have observed that entity and topic are two important kinds of features in social media messages. And there is often close correlation between an entity and a topic in a message. Historical popularity of the entity and the topic as well as the correlation of the entity and the topic, which are seldom addressed in existing prediction tools for popularity prediction, represent sensitivity of the message of interest that may have an impact on future popularity of the message. Therefore, for a message, which either has just been published or is about to be published, it would be helpful to provide information about its sensitivity for use by the prediction tools in predicting popularity of the message.

Figure 2:
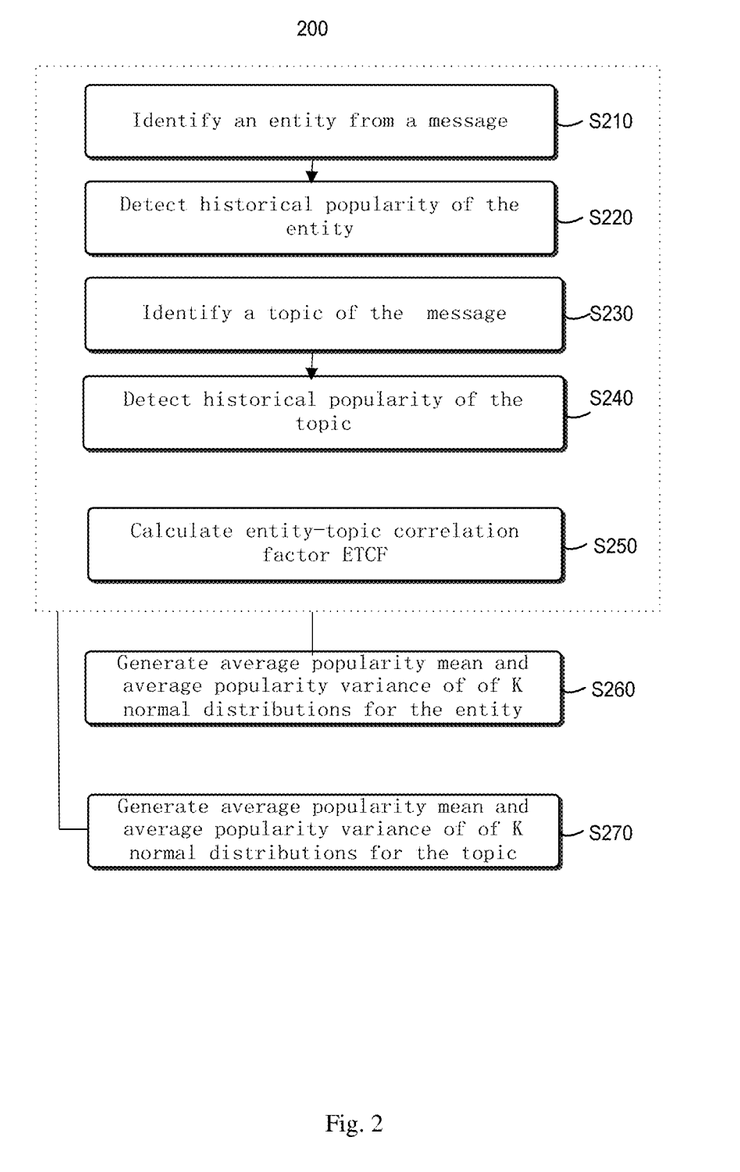
FIG. 2 is a flowchart illustrating a computer-implemented method according to an embodiment of the present invention.

Now, referring to FIG. 2, a method for analyzing a message in social networks will be described. FIG. 2 illustratively shows a flowchart of a method 200 for analyzing a message in social networks according to an embodiment of the invention. As shown in FIG. 2, method 200 comprises the following steps. An entity is identified from the message. (S210) Historical popularity of the entity in social networks is detected. (S220) A topic is identified from the message (S230), and historical popularity of the topic in social networks is detected (S240). An entity-topic correlation factor (ETCF) for the entity and the topic is generated based on the historical popularity of the entity and the historical popularity of the topic. (S250).

Figure 4:
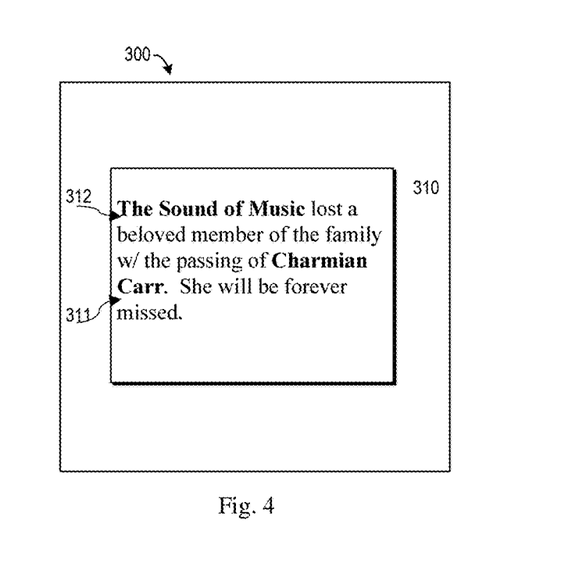
FIG. 4 shows an example of message for processing by embodiments of the present invention.

Assume there is a message that is to be published via social networks like WECHAT®, TWITTER®, FACE-BOOK®, etc. FIG. 4 illustratively shows such a message 310. In FIG. 4 a User Interface (UI) 300 of a social media application is shown. In the UI 300, there is a message 310 which reads "The Sound of Music lost a beloved member of the family w/the passing of Charmian Carr. She will be forever missed."

Now, taking message 310 as an example, method 200 will be described below.

In step S210, an entity 311 is identified from message 310. In the context of embodiments of the invention, an entity is an object such as person, location, organization, product, etc., that can be denoted with a proper name. The task of step S210 is to identify any entity, which is meaningful or significant, from message 310. Step S210 may be implemented with existing Named Entity Recognition (NER) techniques, of which details will be omitted here.

For example, in S210, "Charmian Carr" is identified as an entity 311. Charmian Can was American actress and singer who starred in the film "The Sound of Music". In practical implementations, more than one entity might be identified. For example, "The Sound of Music" might be identified as another entity 312. In the following paragraphs, description of embodiments of the invention will be provided only in connection with entity 311. For the other entity 312, process is the same and thus will not be redundantly provided.

In step S220, historical popularity for entity 311 in social networks is detected. According to an embodiment of the invention, step S220 may be conducted by analyzing historical data and, in particular, by analyzing historical social media messages related to entity 311. In this example, assuming in time $t_i$ (for example, a duration of day i), there are m messages related to entity 311 ("Charmian Can"), and message popularity for message j is $p_j$, (j=1 . . . m), where $p_j$ is the number of times message j was mentioned (e.g., commented, retransmitted, thumb-upped, etc.) in time $t_i$. Historical popularity of entity 311 (also referred to as "entity popularity" where it is clear) in time $t_i$, may be calculated as the summation of message popularity by formula (1) below:

$$HP(F,t_i)=\Sigma_{j=1}^{M}p_j \tag{1}$$

wherein parameter F in HP(F, $t_i$) represents a feature identified from message 310, which is entity 311 in this example.

Figure 5:
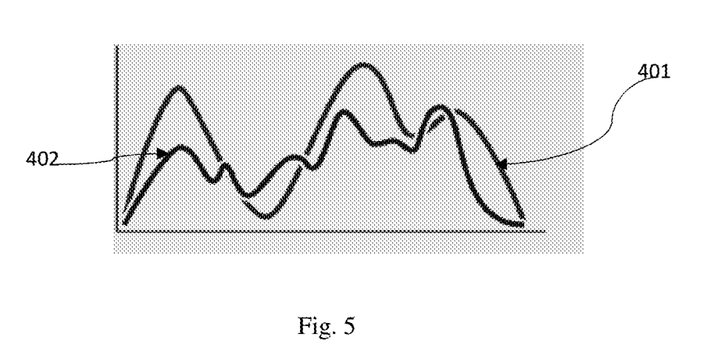
FIG. 5 illustratively shows historical popularity detected according to an embodiment of the present invention.

Referring to FIG. 5, which illustratively shows historical popularity detected according to an embodiment of the present invention. In the coordinates shown in FIG. 5, the horizontal axis represents time and the vertical axis represents popularity. In this example, historical popularity for entity 311 is depicted by message popularity curve 401, which may be denoted by HP (entity 311, $t_i$).

In step S230, a topic "death" is identified from message 310. For ease of representation in the description, the topic will be denoted as "TPC". Generally, a topic may be identified with any semantic analysis technique commonly known in the art.

In step S240, historical popularity for topic "death" in social networks is detected. This can be done in a similar manner as for entity 311 described above and the resulted historical popularity for TPC is depicted by message popularity curve 402 in FIG. 5, which may be denoted by HP(TPC, $t_i$).

In step S250, an entity-topic correlation factor (ETCF) for entity 311 and TPC is calculated based on the historical popularity of entity 311 and TPC, respectively represented by message popularity curve 401 and 402. According to an embodiment of the invention, step S250 comprises steps S251, S253 and S255.

Figure 3:
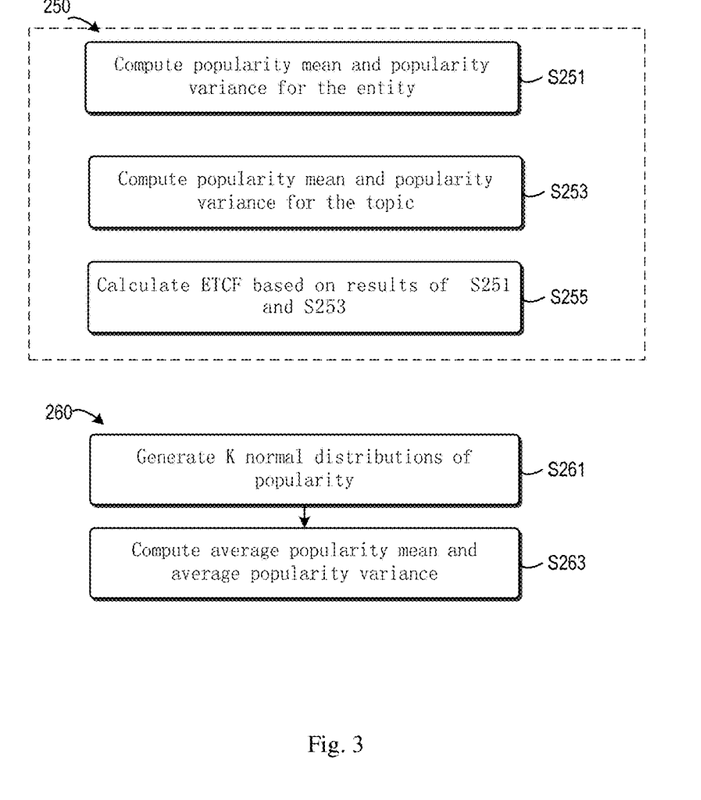
FIG. 3 illustrates some detailed steps of the method of FIG. 2, according to an embodiment of the present invention.

In step S251, a popularity mean and a popularity variance are computed for entity 311 based on historical popularity of entity 311 represented by message popularity curve 401. Specifically, assuming that the popularity of entity 311 in time $t_1, t_2, \ldots t_n$ is $X=\{x_1, x_2, \ldots x_n\}$, where $x_i$=HP("entity 311",$t_i$), as defined in formula (1) in connection with message popularity curve 401, then popularity mean of entity 311, MoP ("entity 311"), is calculated by the following formula (2):

$$u_X = \frac{1}{N}\sum_{i=1}^{N} x_i \quad (2)$$

and popularity variance of entity 311, VoP ("entity 311"), is calculated by the following formula (3):

$$\delta_X = \frac{1}{N}\sum_{i=1}^{N} (x_i - u_X)^2 \quad (3)$$

Then, in step S253, a popularity mean and a popularity variance are computed for TPC based on historical popularity of TPC represented by message popularity curve 402. Specifically, assuming that the popularity of TPC in time $t_1, t_2, \ldots t_n$ is $Y=\{y_1, y_2, \ldots y_n\}$, where $y_i$=HP(TPC, $t_i$), as defined in formula (1) in connection with message popularity curve 402, then popularity mean of TPC, MoP (TPC), is calculated by a formula derived from formula (2) by replacing x with y. A popularity variance for TPC is computed by a formula derived from formula (3) by replacing x with y.

In step S255, entity-topic correlation factor ETCF for entity 311 and TPC is calculated based on the historical popularity of entity 311 and the historical popularity of TPC according to formula (4) below:

$$\rho_{X,Y} = \frac{\text{cov}(X, Y)}{\sigma_X \sigma_Y} = \frac{E[(X-\mu_X)(Y-\mu_Y)]}{\sigma_X \sigma_Y} \quad (4)$$

namely, ETCT(entity 311, TPC)=$\rho_{X,Y}$, wherein $\mu_x$ is the popularity mean of entity 311, $\mu_y$ is the popularity mean of TPC, $\sigma_x$ is the popularity variance of entity 311, $\sigma_y$ is the popularity variance of TPC calculated using formula (3), cov( ) is a covariance function and E( ) is an expectation function.

Entity-topic correlation factor ETCF ("Charmian Carr", "death") is a measure of the linear dependence between entity 311 and TPC. The value range of ETCF is between +1 and −1 inclusive, where 1 means total positive correlation, 0 means no correlation, and −1 means total negative correlation.

Method 200 may be ended at the end of step S250. The result of the method at this stage is a collection of data generated respectively by step S220, S240, and S250. Specifically, the result comprises the following items:
historical popularity for entity 311;
historical popularity for TPC; and
entity-topic correlation factor ETCF for entity 311 and TPC.

In addition to the above data, the invention may provide additional data for popularity prediction. The additional data may be provided by continuing method 200 with steps S260 and/or S270 as shown in FIG. 2.

According to an embodiment, method 200 further comprises generating average popularity mean of K normal distributions for the entity and average popularity variance of K normal distributions for the entity, as depicted by step S260 in FIG. 2.

As shown in FIG. 3, step S260 may be split into two sub-steps S261 and S263.

Figure 6:
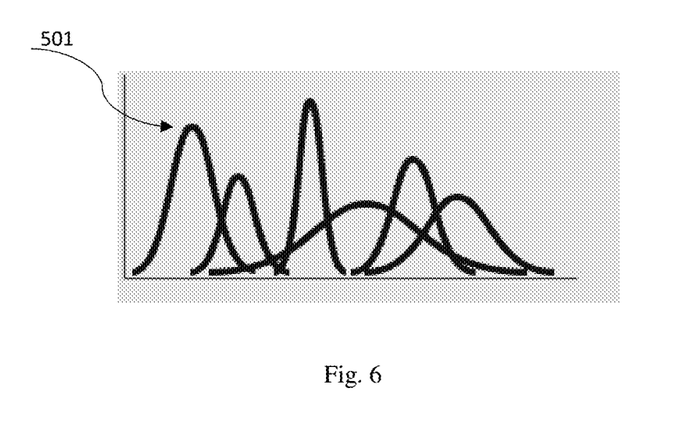
FIG. 6 illustratively shows a number of normal distributions of popularity according to an embodiment of the present invention.

In step S261, a number of normal distributions (K) of popularity for the entity are modeled on the basis of the historical popularity of the entity. Assuming that entity 311's popularity, which varies with time, is caused by K possible events. The entity's popularity is modeled by a mixture model with K different components, each component distributed as a normal distribution with unknown mean and variance, with each component specifying a particular event. The mixture model may be the Gauss Mixture Model (GMM) model which is well known in the art, and K is a pre-defined empirical number. FIG. 6 illustratively shows a number of normal distributions based on historical popularity detected according to an embodiment of the present invention. In the coordinates shown in FIG. 6, the horizontal axis represent time and the vertical axis represents popularity. A normal distribution curve 501 is depicted in FIG. 6 to illustrate a normal distribution generated in this example.

An Expectation Maximization (EM) algorithm is used to learn parameters such as means and variances of K normal distributions with input of entity popularities, i.e. message popularity curve 401. An EM algorithm is a commonly used technology to compute parameters of a GMM model, and the details will be omitted here.

In step S263, the average of the K means obtained in step S261 is calculated to generate "Mean". The average of the K variances obtained in step S261 is calculated to generate "Variance". The result is representation of the prediction of popularity for entity 311, and is denoted by <entity 311, Mean, Variance>, which is <"Charmian Carr", Mean, Variance> in this case. "Mean" is the average of the K means and "Variance" is the average of the K variances. The triple reflects the popularity of entity "Charmian Carr" in history. "Mean" reflects the trend of popular time. Larger values of Mean indicate entity 311 tends to be more popular recently, so messages with entity 311 having larger Mean tend to be more popular. Variance reflects the diversity of popularity degree. Larger values of Variance indicate the entity popularity for entity 311 is very different with time variation. The result <"Charmian Carr", Mean, Variance> may be additionally included into the set of data obtained at the end of step S250 for use by popularity prediction tools.

According to an embodiment, method 200 further comprises generating average popularity mean and average popularity variance of K normal distributions for the topic, as depicted by step S270 in FIG. 2.

Step S270 is performed the same way as S260. First, assuming that topic TPC's popularity is caused by a number (i.e. K) of possible events, the topic's popularity is modeled by a mixture model (for example, GMM model) with K different components, each distributed as a normal distribution with unknown mean and variance, with each component specifying a particular event, where K is a pre-defined empirical number. The EM algorithm is used to learn parameters, i.e., means and variances of K normal distributions with input of topic popularities i.e., message popularity curve 402.

The average of the K means obtained is calculated to generate "Mean". The average of the K variances obtained is calculated to generate "Variance". The result is a representation of the prediction of popularity for TPC, and is denoted by a triple <TPC, Mean, Variance>, which is <"death", Mean, Variance> is this example. Similarly, the triple reflects popularity of topic "death" in history. "Mean" reflects the trend of popular time. Larger values of Mean indicate the topic tends to be more popular recently, so messages with the topic having a larger Mean tend to be more popular. Variance reflects the diversity of popularity degree. Larger values of Variance indicate topic popularity for the topic is very different with time variation.

At the end of S270, a set of data in connection with entity 311 may be generated including those data generated in steps S250, S260 and S270. The set of data may comprise: historical popularity of entity "Charmian Carr", historical popularity of topic "death", KTCF, <"Charmian Carr", Mean, Variance>, and <"death", Mean, Variance>. The set of data reflects sensitivity of the entity and the topic, and the correlation of the entity and the topic. The set of data may be provided for use by popular prediction tools in predicting popularity of the message.

In the above description, method 200 is described for entity 311. In a similar way, method 200 may be performed for entity 312, to separately or additionally generate one or more sets of data like those generated in connection with entity 311.

According to an embodiment of the invention, method 200 may further comprise identifying a social attribute of the entity; detecting historical popularity for the social attribute in social networks; and generating average popularity mean and average popularity variance of a number of normal distributions for the social attribute based on the historical popularity for the social attribute in social networks.

For example, a social attribute of entity 311 may be identified. For example, assuming there is a pre-defined ontology such as Wikipedia, social attributes of entity 311, which is "Charmian Carr", can be looked up from the pre-defined ontology. As a result, a social attribute, "American actress" is identified.

Then, historical popularity for the social attribute "American actress" in social networks is detected. This may be done in the same way as for entity 311 in step S220, except that entity 311 is now replaced by the social attribute.

Finally, average popularity mean and average popularity variance of a number of normal distributions for the social attribute is generated based on the historical popularity for the social attribute in social networks. This may be done in the same way as for entity 311 in step S260, except that entity 311 is now replaced by the social attribute. As a result, a triple like <"American actress", Mean, Variance> is generated which may be additionally included into the set of data obtained at the end of step S250, S260 or S270 for use by popularity prediction tools.

As will be appreciated by those skilled in the art, it is to be noted that the order of steps in method 200 is not necessarily the same as the numbered sequence. For example, step S230 may be executed prior to or in parallel with step S210, since execution of step S230 is not dependent on step S210 Similarly, step S260 may be executed prior to or in parallel with step S250, as execution of step S260 is not dependent on step S250.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for predicting popularity of a message in a social network, comprising:
   identifying an entity from the message;
   detecting historical popularity of the entity in social network;
   identifying a topic from the message;
   detecting historical popularity of the topic in the social network;
   generating an entity-topic correlation factor for the entity and the topic based on the historical popularity of the entity and the historical popularity of the topic by:
      computing a popularity mean and a popularity variance for the entity;
      computing a popularity mean and a popularity variance for the topic; and
      calculating the entity-topic correlation factor based on the popularity mean and the popularity variance for the entity and the popularity mean and the popularity variance for the topic; and
   marketing goods to a user of the social network based on the entity-topic correlation factor.

2. The method according to claim 1, further comprising:
   generating an average popularity mean and an average popularity variance of a number of normal distributions for the entity.

3. The method according to claim 2, wherein said generating average popularity mean and average popularity variance of a number of normal distributions for the entity comprises:
   modeling the number of normal distributions of the entity based on the historical popularity of the entity.

4. The method according to claim 1, further comprising:
   generating an average popularity mean and an average popularity variance of a number of normal distributions for the topic.

5. The method according to claim 1, further comprising:
   identifying a social attribute of the entity
   detecting historical popularity for the social attribute in the social network; and
   generating average popularity mean and average popularity variance of a number of normal distributions for the social attribute based on the historical popularity for the social attribute in the social network.

6. The method of claim 1, further comprising:
   using the entity-topic correlation factor for at least one of risk alarming or real-world outcome prediction.

7. A computing system comprising a computer processor coupled to a computer-readable memory unit, the memory unit comprising instructions that when executed by the computer processor implements a method for predicting popularity of a message in a social network, the method comprising:
   identifying an entity from the message;
   detecting historical popularity of the entity in the social network;
   identifying a topic from the message;

detecting historical popularity of the topic in the social network; and generating an entity-topic correlation factor for the entity and the topic based on the historical popularity of the entity and the historical popularity of the topic by:

computing a popularity mean and a popularity variance for the entity;

computing a popularity mean and a popularity variance for the topic; and calculating the entity-topic correlation factor based on the popularity mean and the popularity variance for the entity and the popularity mean and the popularity variance for the topic; and marketing goods to a user of the social network based on the entity-topic correlation factor.

8. The computing system according to claim 7, wherein the method further comprises:

generating average popularity mean and average popularity variance of a number of normal distributions for the topic.

9. The computing system according to claim 7, wherein the method further comprises:

generating average popularity mean and average popularity variance of a number of normal distributions for the entity.

10. The computing system according to claim 9, wherein said generating average popularity mean and average popularity variance of a number of normal distributions for the entity comprises:

modeling the number of normal distributions of the entity based on the historical popularity of the entity.

11. The computing system according to claim 7, wherein the method further comprises:

identifying a social attribute of the entity;

detecting historical popularity for the social attribute in social networks; and generating average popularity mean and average popularity variance of a number of normal distributions for the social attribute based on the historical popularity for the social attribute in social network.

12. The computer system of claim 7, wherein the method further comprises:

using the entity-topic correlation factor for at least one of risk alarming or real-world outcome prediction.

13. A computer program product being tangibly stored on a non-transient machine-readable medium and comprising machine-executable instructions for predicting popularity of a message in a social network, the instructions, when executed on an electronic device, causing the electronic device to perform the following:

identifying an entity from the message;

detecting historical popularity of the entity in the social network;

identifying a topic from the message;

detecting historical popularity of the topic in social networks; and generating an entity-topic correlation factor for the entity and the topic based on the historical popularity of the entity and the historical popularity of the topic by:

computing a popularity mean and a popularity variance for the entity;

computing a popularity mean and a popularity variance for the topic; and calculating the entity-topic correlation factor based on the popularity mean and the popularity variance for the entity and the popularity mean and the popularity variance for the topic; and marketing goods to a user of the social network based on the entity-topic correlation factor.

14. The computer program product according to claim 13, the instructions further causing the electronic device to perform the following:

generating average popularity mean and average popularity variance of a number of normal distributions for the entity.

15. The computer program product according to claim 13, the instructions further causing the electronic device to perform the following:

generating average popularity mean and average popularity variance of a number of normal distributions for the topic.

16. The computer program product according to claim 15, wherein said generating average popularity mean and average popularity variance of a number of normal distributions for the entity comprises:

modeling the number of normal distributions of the entity based on the historical popularity of the entity.

17. The computer program product according to claim 13, the instructions further causing the electronic device to perform the following:

identifying a social attribute of the entity;

detecting historical popularity for the social attribute in the social network; and generating average popularity mean and average popularity variance of a number of normal distributions for the social attribute based on the historical popularity for the social attribute in the social network.

18. The computer program product according to claim 13, wherein the method further comprises:

using the entity-topic correlation factor for at least one of risk alarming or real-world outcome prediction.

* * * * *